United States Patent

[11] 3,624,069

[72] Inventor Richard G. Schweiger
 San Diego, Calif.
[21] Appl. No. 467,738
[22] Filed June 28, 1965
[45] Patented Nov. 30, 1971
[73] Assignee Kelco Company
 San Diego, Calif.
 Continuation-in-part of Ser. No.
 347,351, Feb. 26, 1964

[54] PROCESS OF PREPARING A GELLABLE COLLOIDAL CELLULOSE SULFATE AND PRODUCT
 21 Claims, No Drawings

[52] U.S. Cl............................................................ 260/215,
 99/139
[51] Int. Cl............................................................ C08b 5/14
[50] Field of Search................................................ 260/210,
 233.5, 215

[56] References Cited
UNITED STATES PATENTS

| | | | |
|---|---|---|---|
| 2,705,710 | 4/1955 | Blume............................ | 260/229 |
| 3,544,555 | 12/1970 | Biritz et al..................... | 260/215 |
| 3,057,855 | 10/1962 | Smith et al..................... | 260/233.5 |
| 3,070,595 | 12/1962 | Petracek et al................ | 260/233.5 |
| 3,077,373 | 2/1963 | Kerr............................... | 260/233.5 |
| 3,200,110 | 8/1965 | Gollin et al..................... | 260/210 |
| 2,697,093 | 12/1954 | Jones............................. | 260/215 |

*Primary Examiner*—Donald E. Czaja
*Assistant Examiner*—Ronald W. Griffin
*Attorneys*—Elwood S. Kendrick and Kendrick, Subkow and Stolzy ABSTRACT: Water-soluble gellable sulfate esters of cellulose are prepared by soaking cellulose in a lower N-dialkyl amide and then contacting said cellulose with a sulfur trioxide-lower N-dialkyl amide sulfation complex.

PROCESS OF PREPARING A GELLABLE COLLOIDAL CELLULOSE SULFATE AND PRODUCT

This application is a continuation-in-part of my application entitled PROCESS OF PREPARING CELLULOSE SULFATE AND PRODUCT THEREOF filed Feb. 26, 1964, Ser. No. 347,351 and now abandoned.

This invention relates to a method of preparing colloidal cellulose sulfates and particularly cellulose sulfates that are useful for preparing thermoreversible aqueous gels in the presence of potassium ions and to products obtained by said method.

Sulfate esters of cellulose have been prepared by a number of methods described in the literature. These methods all suffer from various disadvantages. Thus, for example, many of the methods which have been described lead to a substantial degree of degradation, that is, depolymerization of the cellulose during the process of esterification, so that while a sulfate ester is produced, its molecular weight is not nearly as high as would have been the case had not degradation taken place. This leads to products which are not applicable for many purposes, especially in uses which depend upon gel formation and the colloidal nature of the sulfate ester and of its salts. Again, other methods have been proposed which are carried out in the presence of tertiary amines, such as triethylamine, pyridine, and the like, but the resulting esters are in the form of an organic salt such as a pyridinium salt, which must be removed and substituted by sodium or hydrogen, for example, in order to obtain the ultimately desired product, and incidentally to obviate the consumption of a relatively expensive organic chemical. Besides, most methods do not provide for a relatively high degree of substitution (D.S.), whereas for many applications the most useful sulfate esters are those which have a degree of substitution between 1.0 and 3.0.

An object of the present invention is to provide a process for producing sulfate esters of cellulose in which the cellulose remains relatively undegraded, and thus the end product exhibits colloidal properties with a desired degree of substitution, and in which an ultimately desirable salt or free acid may be obtained with a minimum expenditure of materials and processing.

It is a further and important object of this invention to provide colloidal cellulose sulfates suitable for forming thermoreversible aqueous gels with certain cations and a method of preparing such sulfates.

Further objects of the invention will appear as the description thereof proceeds.

Generally speaking, and in accordance with illustrative embodiments of my invention, I form a complex of sulfur trioxide and a lower N-dialkyl amide, and use this as a sulfating reagent for cellulose which has preferably been admixed or diluted prior to sulfating with at least an equal weight of the same lower N-dialkyl amide.

As the N-dialkyl amide, I prefer and find best dimethyl formamide, although I may also use diethyl formamide, dimethyl acetamide, diethyl acetamide, and dimethyl propionamide.

The admixture of the cellulose with a diluent and preferably with the N-dialkyl amide used in preparing the complex, preferably dimethyl formamide, facilitates recovery of the said diluent following the reaction. A prior admixture of the cellulose with such a diluent minimizes heat problems and minimizes degradation at the time the cellulose is contacted with the reaction complex.

In preparing the reaction complex at least one mole of the N-dialkyl amide, such as dimethyl formamide, should be present for each mole of sulfur trioxide and preferably two moles of the N-dialkyl amide. In attempting to carry out the reaction between cellulose and such a complex having only equal molar proportions of ingredients in the complex a problem arises in providing contact between the reacting ingredients in that said materials would be substantially in the solid state. Thus, an excess of the N-dialkyl amide in the complex is desired and preferably in addition thereto premixing of the cellulose with at least an equal amount by weight of the N-dialkyl amide used in preparing the complex. Other organic solvents, however, may be used as a diluent for the cellulose such as a N-dialkyl amide other than the one used in preparing the complex or organic solvents such as chloroform, benzene, and the like. Again, as aforementioned, it is an advantage to use the N-dialkyl amide as the diluent for the cellulose that is used in preparing the sulfating complex in accordance with my invention.

An excess of lower N-dialkyl amide in the complex forms a pourable mixture having a still further advantage of giving assistance in heat control during the sulfating step. The N-dialkyl amide, for example dimethyl formamide or other diluent admixed with the cellulose prior to the sulfating step, should be used in an amount in the range of 1 to 10 times the weight of the cellulose. Thus, for example, with 100 g. of cellulose I may use from 100 to 1000 g. of dimethyl formamide. Although larger amounts of diluent are not precluded they are not required.

The $SO_3$-N-dialkyl amide complex at a molar ratio of 1 to 1 should be present in the reaction mixture in an amount of 1 to 8 times the weight of the weight of the cellulose—larger amounts are not precluded but would be wasteful. In general it is desirable to use at least two times the weight of the cellulose of such a complex.

Any available form of cellulose may be used, and the choice thereof will in general be determined by the purity and nature of the product desired. Thus, long fiber cotton gives the choicest product, but is relatively expensive. Chemically treated cotton linters are a preferred source of cellulose, a further and adequate source of cellulose is cellulose derived from wood. Even ground wood can be used, particularly those varieties relatively rich in cellulose and relatively poor in lignin and other constituents, although these lead to relatively low grade products. The word cellulose as used herein and in the appended claims includes cellulose from various sources and in the foregoing forms.

I find that in general a reaction temperature of 0° C. to 25° C. is suitable, and preferably below 15° C. The reaction time for relatively complete esterification is from 1 hour to several hours, depending of course upon the selected temperature and the relative concentrations of the reactants, including the diluent and sulfur trioxide in the reaction mixture. In general I use a reaction time of 2 to 8 hours and preferably 3 to 4 hours.

Since the complex of sulfur trioxide and dialkyl formamide reacts preferentially with water, the starting cellulose should be dry, as otherwise reagent is consumed in the reaction with water, which is not any great disadvantage technically, but is from a standpoint of production costs.

The product which is obtained immediately following the esterification may be neutralized by adding the calculated amount of aqueous solutions of an alkali metal or ammonium hydroxide, carbonate or bicarbonate. The resulting neutralized product may be precipitated therefrom by alcohols, acetone or other water miscible solvents.

If desired, the free ester may be separated by precipitation with acetone or alcohol or other like solvent, whereupon the precipitate is dissolved in water and subsequently neutralized with the alkali as just described.

It will, of course, be understood that the esters contemplated are half esters of sulfuric acid, so that one of the hydrogen ions originally present in the sulfuric acid is still free to react to give salts. Thus, in the case of the sodium cellulose sulfate ester which I may prepare in accordance with my invention, one of the valencies of the sulfuric acid is esterified with a hydroxyl group of the cellulose, and the other is neutralized by salt formation with a sodium ion. In view of the chemical substitution of cellulose, a maximum degree of substitution (D.S.) of 3.0 is possible, and it is remarkable that when proceeding in accordance with my invention degrees of substitution well above 2.0 are obtained while still maintaining the cellulose polymer substantially undegraded. In general my method is useful in producing cellulose sulfates having a D.S. in the range of 1 to about 3. As demonstrated by the examples which follow, my products having a D.S. of 1 to about 3 have a viscosity of 45 c.p.s. to 500 c.p.s. at a 1 percent concentration in an aqueous media as measured by a Brookfield Synchro Electric Viscometer Model LVF at 60 r.p.m. and a temperature of 25° C. My method is particularly useful in that it will produce such sulfates that in aqueous solution will form gels when potassium ions are added thereto. The cellulose sulfates prepared in accordance with my invention having a D.S. in excess of 1 and preferably in the range of 1.5 to 2.6 are particularly suitable in applications in which it is desired to form a gel by reaction with a potassium ion. Concerning the matter of forming gels with the cellulose sulfates of my invention, in the foregoing I have suggested potassium as a suitable ion. Although other cations such as ammonium will form gels with the cellulose sulfates produced in accordance with my invention, I have found potassium ions preferable for this purpose.

Some examples of procedures and products thereof in accordance with my invention follow, in which "DMF" indicates dimethyl formamide, and "D.S." indicates degree of substitution; viscosities of aqueous solutions at the indicated concentration have been determined with a Brookfield Synchro Electric Viscometer Model LVF at 60 r.p.m. and 25° C.

EXAMPLE I

One hundred of cellulose was mixed thoroughly with 300 g. of DMF and the resulting mixture refrigerated. This cooled mixture was then placed in a jacketed (Day) mixer cooled with ice water. The said mixture was then admixed in said mixer with 450 g. of an ice cold $SO_3$—DMF—complex. The mixing was continued for three hours. The resulting reaction mixture was then dissolved in ice cold water and neutralized with sodium hydroxide. The solution resulting therefrom was filtered through a Büchner funnel. The sodium cellulose sulfate so prepared and present in the resulting filtrate was precipitated from methanol and dried at 45° C. in the presence of an air stream. A 1 percent solution of the sodium cellulose sulfate so prepared had a viscosity of 280 c.p.s. The yield of sodium cellulose sulfate from the foregoing was 260 g. and the said product had a D.S. of 2.4.

The $SO_3$—DMF—complex used in the above example was prepared by adding sulfur trioxide (1 mole) slowly and with cooling to twice the theoretical amount of DMF (2 moles). The resulting complex was a crystalline colorless material wet with DMF. The said complex was used in the experimental work set forth in example I without filtration. An $SO_3$–DMF—complex so prepared was used in each of the examples that follow.

The analysis to establish the D.S. in the above and in the following examples was carried out by refluxing a 0.5 g. sample of the resulting product for 12 hours with 50 cc. of a 10 percent hydrochloric acid solution. The sulfuric acid produced therefrom was precipitated with barium chloride and the barium sulfate formed therefrom was weighed. The D.S. was calculated from the weight of the barium sulfate.

EXAMPLE II

A. A 100 g. sample of cotton linters having a high degree of polymerization (high D.P.) was mixed thoroughly with 400 g. of DMF and the resulting mixture refrigerated. This mixture was then placed in a jacketed (Day) mixer cooled with ice water. The said mixture was then admixed in said mixer with 450 g. of an ice cold $SO_3$—DMF—complex. The mixing was continued for 3 hours. The resulting reaction mixture was then dissolved in ice cold water and neutralized with sodium hydroxide. The solution resulting therefrom was filtered through a Büchner funnel. The sodium cellulose sulfate so prepared and present in the resulting filtrate was precipitated from methanol and dried at 45° C. in the presence of an air stream. A 1 percent solution of the sodium cellulose sulfate so prepared had a viscosity of 490 c.p.s. The yield was 250 g. and the product so produced had a D.S. of 2.3.

B. The example set forth in IIA above was repeated substituting cotton linters having a medium degree of polymerization for the cotton linters having a high degree of polymerization. The resulting product had a viscosity of 200 c.p.s. in a 1 percent solution and a D.S.

C. The example set forth in IIA above was repeated with the exception that the amount of complex was increased from 400 to 600 g. All other conditions in this experiment were kept the same as in the experiment set forth in example IIA above. The resulting product has a D.S. of 2.7.

D. The example set forth in IIA above was repeated substituting cotton linters having a medium degree of polymerization for the cotton linters having a high degree of polymerization and increasing the amount of complex from 400 to 600 g. Again, the resulting product, as in example IIC, had a D.S. of 2.7.

EXAMPLE III

A. A 100 g. sample of untreated cotton (second cut) was soaked in a relatively large amount of DMF and thereafter excess DMF was removed until an amount of 600 g. of DMF was left in the cotton. This mixture was cooled and placed in a jacketed (Day) mixer cooled with ice water. The said mixture was then admixed in said mixer with 500 g. of an ice-cold $SO_3$—DMF—complex. The mixing was continued for 3 hours. Again, as in example I, the mixture was dissolved in water, neutralized with sodium hydroxide, filtered and the resulting product precipitated with methanol. A 1 percent solution of the resulting product had a viscosity of 500 c.p.s. The yield of sodium cellulose sulfate was 200 g. and the said product had a D.S. of 2.0.

B. The experiment set forth in IIIA was repeated substituting potassium hydroxide for sodium hydroxide. The resulting potassium cellulose sulfate precipitated from the aqueous solution thereof at low temperature as soon as the potassium hydroxide was added and said potassium salt was readily isolated. A 1 percent solution of the potassium cellulose sulfate so prepared had a viscosity of 310 c.p.s. The yield was 270 g. and the D.S. was 2.4.

The color of the resulting products in both IIIA and IIIB above was light tan.

EXAMPLE IV

A. The procedure of example I was repeated substituting 100 g. of unbleached kraft pulp for the cellulose of the said example I. The product resulting therefrom had a viscosity of 145 c.p.s. in a 1 percent solution. The yield was 230 g. and the product had a D.S. of 2.2.

B. The procedure of example I was repeated substituting 100 g. of unbleached kraft pulp for the cellulose and reducing the amount of the $SO_3$—DMF—complex from 450 g. to 300 g. The resulting product had a viscosity of 170 c.p.s. in a 1 percent solution. The yield was 130 g. and the said product had a D.S. of 1.8.

EXAMPLE V

A. A 100 g. sample of bleached pulp was mixed thoroughly with 945 g. of DMF and the resulting mixture refrigerated. This cooled mixture was then placed in a jacketed (Day) mixer cooled with ice water. The said mixture was then admixed in said mixer with 650 g. of an ice cold $SO_3$—DMF—complex. The mixing was continued for 3 hours. The resulting reaction mixture was then dissolved in ice cold water and neutralized with ammonium hydroxide. The solution resulting therefrom was filtered through a Büchner funnel. The ammonium cellulose sulfate so prepared and present in the resulting filtrate was precipitated from methanol. A 1 percent solution of the ammonium cellulose sulfate so prepared had a viscosity of 65 c.p.s. The yield of ammonium cellulose sulfate from the foregoing was 270 g. and the said product had a D.S. of 2.5.

B. The procedure set forth in example V-A was repeated substituting cellulose powder (Whatman standard grade) for the bleached pulp. The resulting ammonium cellulose sulfate so prepared had a viscosity of 45 c.p.s. in a 1 percent solution. The yield was 260 g. and the said ammonium cellulose sulfate product had a D.S. of 2.4.

EXAMPLE VI

A 50 g. sample of microcrystalline cellulose (Avicel sold by American Viscose Corporation) was mixed thoroughly with 95 g. of DMF and the resulting mixture refrigerated. This cold mixture was then placed in a jacketed (Day) mixer cooled with ice water. The said mixture was then admixed in said mixer with 400 g. of an ice cold $SO_3$—DMF—complex. The mixing was continued for 3 hours. The resulting reaction mixture was admixed with isopropanol, the solids separated by filtration, dissolved in water, neutralized with ammonium hydroxide, and the ammonium cellulose sulfate precipitated from methanol. A 1 percent solution of the said ammonium cellulose sulfate had a viscosity of 15 c.p.s. The yield was 79 g. and the product had a D.S. of 0.8.

EXAMPLE VII

A. A 60 g. sample of cotton linters in sheet form was vigorously admixed with 1000 g. of DMF and excess DMF removed to leave 450 g. of DMF. The resulting mixture was refrigerated. This cold mixture was then placed in a jacketed (Day) mixer cooled with ice water. The said mixture was then admixed in said mixer with 240 g. of an ice cold $SO_3$—DMF—complex. The mixing was continued for 3 hours. The resulting reaction mixture was then dissolved in ice cold water and neutralized with sodium hydroxide. The solution resulting therefrom was filtered through a Büchner funnel. The sodium cellulose sulfate so prepared and present in the resulting filtrate was precipitated from methanol and dried at 45° C. in the presence of an air stream. A 1 percent solution of the sodium cellulose sulfate so prepared had a viscosity of 232 c.p.s. The yield of sodium cellulose sulfate from the foregoing was 139 g. and the said product had a D.S. of 1.74.

B. The procedure of Example VIIA was repeated except the amount of $SO_3$—DMF—complex was reduced from 240 g. to 220 g. The resulting product had a viscosity of 211 c.p.s. in a 1 percent solution. The yield was 131 g. and the product had a D.S. of 1.61.

C. The experiment of Example VIIA was repeated except the amount of $SO_3$—DMF—complex was reduced from 240 g. to 180 g. The resulting product had a viscosity of 170 c.p.s. in a 1 percent solution. The yield was 88 g. and the product had a D.S. of 1.12.

The sulfate cellulose esters produced in accordance with my invention may be used in their free, i.e., hydrogen form, or they may be neutralized, either partially or completely, with various bases, to give alkali metal salts, such as sodium, lithium, potassium, ammonium, and the like; or polyvalent metal salts, such as calcium, magnesium, barium, aluminum; or with organic cations, especially short chain alkyl and alkylol substituted ammonium, such as methylammonium, triethanolammonium, dimethylbenzylammonium, and the like.

Aqueous solutions of cellulose sulfate prepared according to my invention as aforementioned form gels when potassium ions are added. As a source of potassium ions, any water soluble potassium salt, such as potassium chloride, potassium sulfate, etc. may be used. The strength of the gels depends on the D.S., on the viscosity, and on the concentration of cellulose sulfate and potassium ions. It is desirable that the potassium ion or other gel forming cation be present in an amount in excess of 9 milliequivalents per 100 cc. of aqueous solution containing sufficient cellulose sulfate to form a gel, for example 1 percent by weight. The setting or melting points of such gels depends on the potassium ion concentration. An increase of potassium ion concentration will increase the melting or setting points of my gels. Such gels may be prepared by my method having thermoreversible melting or gel points in the range of 0° C. to 45° C.

A cellulose sulfate prepared in accordance with my invention has good reactivity with protein, for example casein.

To illustrate a use of products made in accordance with my invention, an edible milk gel may be made therefrom by dry blending the following ingredients:

3.0 g. Potassium cellulose sulfate
0.1 g. Sodium chloride
0.1 g. Vanillin
35.0 g. Sugar To the dry blended ingredients produced as above, one cup of hot milk should be added and the mixture stirred for about 3 minutes. The resulting dessert should be poured into pudding dishes and refrigerated. It will be ready to eat when cooled.

The gel-forming qualities of a cellulose sulfate prepared in accordance with my invention may be noted by subjecting a sample thereof to a test with a Bloom Gelometer. The Bloom Gelometer is an instrument that is available commercially from the Precision Scientific Company, 3737 West Cortland Street, Chicago 47, Illinois. It was developed by Dr. Oscar Bloom of Swift & Company and is used to determine the gel strength of food products such as gelatin desserts and starch dessert powders. The instrument is used by governments and institutions in testing not only gelatin desserts but other type gel desserts as well. In general, the instrument is a device that contains a plunger that is lowered a predetermined distance, usually 4 mm., into the sample. Force applied to the plunger to drive it against the resistance of the gel or jelly is a direct measure of the gel strength or jelly strength of the material tested. The result is reported in grams. More particularly, a 2 g. sample of sodium cellulose sulfate (D.S. 2.1) was dissolved in 100 cc. of water and subjected to a Bloom gel test as hereinafter set forth. The solution so prepared was poured into a Bloom bottle, heated to 60° C. and 2 g. of potassium chloride was dissolved in it. The solution was cooled to room temperature. As soon as the temperature dropped below about 45° C. the mixture started to gelatinize. The gel strength determined by a Bloom Gelometer at 20° C. was 95 g.

The foregoing test was repeated by substituting a sodium cellulose sulfate prepared in accordance with my invention having a D.S. of 1.6. The Bloom gel strength was 55 g. A still further sodium cellulose sulfate prepared in accordance with my invention and having a D.S. of 1.1 was subjected to the foregoing Bloom gel strength test and had a gel strength as so determined of 14 g.

It will be appreciated that while I have described my invention with the aid of various specific examples including particular materials, reaction times and temperatures, and the like, various modifications are possible within the broad scope of my invention, as set forth in the claims which follow.

I claim:

1. A process for forming a water-soluble gellable sulfate ester of cellulose by reaction of cellulose with a sulfation complex which comprises soaking cellulose in a lower N-dialkylamide for a sufficient time to minimize degradation of the cellulose when it is contacted with the sulfation complex, and the reacting said cellulose with a sulfur trioxide lower N-dialkylamide sulfation complex in the presence of a lower N-dialkylamide reaction solvent at a reaction temperature of 0° to 25° C., and allowing the reaction to continue under essentially anhydrous conditions until said cellulose is esterified to a degree of substitution within the range of 1 to 3 and is relatively undegraded such that it has a viscosity in a one percent by weight aqueous solution of 45 c.p.s. to 500 c.p.s. as determined with a Brookfield Model LVF Viscometer at 60 r.p.m. and a temperature of 25° C.

2. The process of claim 1 wherein the reaction is continued until said cellulose is esterified to a degree of substitution within the range of 1.5 to 2.6.

3. The process of claim 1 in which at least 1 mole of a lower N-dialkylamide is present for each mole of sulfur trioxide.

4. The process of claim 3 in which the lower N-dialkylamide is dimethylformamide.

5. The process of claim 1 in which the N-dialkylamide is dimethylformamide and in which said complex is prepared with more than one mole of dimethylformamide for each mole of sulfur trioxide.

6. The process of claim 1 in which the dialkylamide is dimethylformamide.

7. The process of claim 1 in which the lower N-dialkylamide is present in the range of 1–10 times the weight of the cellulose.

8. The process of claim 1 wherein the reaction is continued until said cellulose is esterified to a degree of substitution in excess of 2.0.

9. A process for forming a water-soluble gellable sulfate ester of cellulose by reaction of cellulose with a sulfation complex which comprises soaking cellulose in dimethylformamide for a sufficient time to minimize degradation of the cellulose when it is contacted with the sulfation complex and then contacting said cellulose in the presence of N-dimethylformamide as the reaction solvent with from one to eight times the weight of said cellulose of a sulfur trioxide-dimethylformamide sulfation complex containing at least one mole of dimethylformamide for each mole of sulfur trioxide in said complex, maintaining the reaction mixture at a reaction temperature of 0 to 25° C., and allowing the reaction to continue until said cellulose is esterified to a degree of substitution within the range of 1 to 3 and has a viscosity at a 1 percent concentration in aqueous solution of 45 c.p.s. to 500 c.p.s. as determined with a Brookfield Model LVF Viscometer at 60 r.p.m. and a temperature of 25° C.

10. The process of claim 9 wherein said cellulose is soaked in dimethylformamide in an amount from 1 to 10 times the weight of said cellulose, and said cellulose is then contacted with said sulfur trioxide-dimethylformamide complex in an amount from 2 to 4 times the weight of said cellulose.

11. The process of claim 9 wherein the reaction is continued until said cellulose is esterified to a degree of substitution in excess of 2.0.

12. A colloidal water-soluble cellulose sulfate having a degree of substitution in the range of 1–3 and a viscosity of 45 c.p.s. to 500 c.p.s. at a one percent concentration in an aqueous media as measured by a Brookfield Synchro Electric Viscometer Model LVF at 60 r.p.m. and a temperature of 25° C., the said cellulose sulfate being further characterized in said concentration of one percent in an aqueous media as reactive with potassium ions to form a thermoreversible gel.

13. The base neutralized salts of the colloidal water-soluble cellulose sulfate defined in claim 12.

14. The alkali metal salts of the colloidal water-soluble cellulose sulfate defined in claim 12.

15. A colloidal water-soluble cellulose sulfate as defined in claim 12, in which the degree of substitution is in excess of 2.0.

16. The alkali metal salts of the colloidal water-soluble cellulose sulfate defined in claim 15.

17. The potassium salt of the colloidal water-soluble cellulose sulfate defined in claim 15.

18. An aqueous gel containing water and the potassium salt of a colloidal water-soluble cellulose sulfate as defined in claim 17.

19. The process of forming an aqueous gel comprising adding the potassium salt defined in claim 17 to water.

20. The process of forming an aqueous gel, said process comprising forming an aqueous solution of the colloidal water-soluble cellulose sulfate defined in claim 12, said colloidal water-soluble cellulose sulfate being present at a concentration which is sufficient to form a gel on the addition of potassium ions, and adding potassium ions in an amount in excess of 9 milliequivalents for each 100 cubic centimeters of said aqueous solution.

21. A colloidal water-soluble cellulose sulfate having a degree of substitution in the range of 1.5 to 2.6 and a viscosity of 45 c.p.s. to 500 c.p.s. at a one percent concentration in an aqueous media as measured by a Brookfield Synchro Electric Viscometer Model LVF at 60 r.p.m. and a temperature of 25° C., the said cellulose sulfate being further characterized in said concentration of one percent in an aqueous media as reactive with potassium ions to form a thermoreversible gel.

* * * * *